United States Patent
Sakamoto et al.

(10) Patent No.: US 10,564,495 B2
(45) Date of Patent: Feb. 18, 2020

(54) LIQUID CRYSTAL DISPLAY DEVICE

(71) Applicant: Sharp Kabushiki Kaisha, Sakai, Osaka (JP)

(72) Inventors: Mayuko Sakamoto, Sakai (JP); Kenji Misono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/300,612

(22) PCT Filed: Jul. 6, 2017

(86) PCT No.: PCT/JP2017/024836
§ 371 (c)(1),
(2) Date: Nov. 12, 2018

(87) PCT Pub. No.: WO2018/008725
PCT Pub. Date: Jan. 11, 2018

(65) Prior Publication Data
US 2019/0155115 A1    May 23, 2019

(30) Foreign Application Priority Data
Jul. 8, 2016    (JP) .................................. 2016-136412

(51) Int. Cl.
*G02F 1/1333*    (2006.01)
*G02F 1/1362*    (2006.01)
(Continued)

(52) U.S. Cl.
CPC ...... *G02F 1/136204* (2013.01); *G02F 1/1333* (2013.01); *G02F 1/1337* (2013.01);
(Continued)

(58) Field of Classification Search
CPC ................................................. G02F 1/136204
See application file for complete search history.

(56) References Cited

U.S. PATENT DOCUMENTS

2009/0128761 A1*  5/2009  Tamatani .............. G02F 1/1333
                                                            349/122
2010/0182524 A1    7/2010  Nomura

FOREIGN PATENT DOCUMENTS

JP    10-160920 A    6/1998
JP    2008-83114 A   4/2008
(Continued)

OTHER PUBLICATIONS

Official Communication issued in International Patent Application No. PCT/JP2017/024836, dated Oct. 3, 2017.

*Primary Examiner* — James A Dudek
(74) *Attorney, Agent, or Firm* — Keating & Bennett, LLP

(57) ABSTRACT

A liquid crystal display device according to one aspect of the disclosure includes: a liquid crystal panel including a first substrate and a second substrate that oppose each other, and a liquid crystal layer of a horizontal alignment type provided between the first substrate and the second substrate; and a first polarizing plate and a second polarizing plate that sandwich the liquid crystal panel. A transparent conductive film layer connected to a ground potential is formed on the first substrate. A plurality of pixel electrodes are formed above the second substrate. A distance between the liquid crystal layer and the transparent conductive film layer ranges 15 μm to 200 μm.

11 Claims, 9 Drawing Sheets

(51) Int. Cl.
  *G02F 1/1368* (2006.01)
  *G02F 1/1343* (2006.01)
  *G02F 1/1335* (2006.01)
  *G02F 1/1337* (2006.01)
  *G02B 5/30* (2006.01)
  *G02B 5/20* (2006.01)

(52) U.S. Cl.
  CPC .......... *G02F 1/1343* (2013.01); *G02F 1/1368* (2013.01); *G02F 1/133305* (2013.01); *G02F 1/133528* (2013.01); *G02B 5/201* (2013.01); *G02B 5/30* (2013.01); *G02F 1/133514* (2013.01); *G02F 1/134363* (2013.01); *G02F 1/136227* (2013.01); *G02F 2001/133334* (2013.01); *G02F 2001/133742* (2013.01); *G02F 2001/134372* (2013.01); *G02F 2201/122* (2013.01); *G02F 2201/123* (2013.01)

(56) References Cited

FOREIGN PATENT DOCUMENTS

| | | |
|---|---|---|
| JP | 2008-216966 A | 9/2008 |
| JP | 2010-164800 A | 7/2010 |
| JP | 2014-77925 A | 5/2014 |

\* cited by examiner

LIQUID CRYSTAL DISPLAY DEVICE

TECHNICAL FIELD

An aspect of the disclosure relates to a liquid crystal display device.

This application claims priority from JP 2016-136412 A, filed on Jul. 8, 2016 in Japan, the entirety of which is incorporated by reference herein.

BACKGROUND ART

In an In-Plane Switching (IPS) mode and a Fringe Field Switching (FFS) mode in which liquid crystal molecules are aligned transversely to a substrate plane and a transverse electrical field is applied to a liquid crystal layer, an electrode for liquid crystal driving is not provided unlike a VA mode and a TN mode. Thus, this mode has a problem that the device is easily affected by statistic electricity and charges are accumulated inside a liquid crystal panel, which adversely affects display.

To overcome the above-described problem, in liquid crystal panels with inorganic glass substrates, which are widely available over the world, a transparent conductive film layer (in general, ITO) is formed by sputtering on a rear face (opposite side to a liquid crystal layer) of a color filter substrate (see, for example, PTL 1).

The technique of PTL 1 prevents statistic electricity from being charged from a color filter by forming a transparent electrode film that can withstand the etching in an etching step for black matrix of the color filter substrate.

CITATION LIST

Patent Literature

PTL 1: JP H10-160920 A

SUMMARY

Technical Problem

However, in liquid crystal panels that adopt a resin film of high flexibility or bendability (thin, lightweight, and not fragile) for a substrate, a transparent electrode (ITO) cannot be formed on a counter substrate (e.g., color filter substrate) opposite to a TFT substrate through the same process as that of a liquid crystal panel with an inorganic glass substrate due to a manufacturing process.

An aspect of the disclosure has been accomplished in view of the above-described problems in the related art and an object thereof is to provide a liquid crystal display device that is capable of efficiently releasing charges accumulated in a liquid crystal panel and causes no adverse effect on display.

Solution to Problem

A liquid crystal display device according to one aspect of the disclosure includes: a liquid crystal panel including a first substrate and a second substrate that oppose each other, and a liquid crystal layer of a horizontal alignment type provided between the first substrate and the second substrate; and a first polarizing plate and a second polarizing plate that sandwich the liquid crystal panel. A transparent conductive film layer connected to a ground potential is formed on the first substrate. A plurality of pixel electrodes are formed above the second substrate. A distance between the liquid crystal layer and the transparent conductive film layer ranges from 15 μm to 200 μm.

The liquid crystal display device according to one aspect of the disclosure may be configured such that a common electrode is formed above the second substrate substantially throughout a display region.

The liquid crystal display device according to one aspect of the disclosure may be configured such that a color filter layer is formed above the first substrate on a side closer to the liquid crystal layer.

The liquid crystal display device according to one aspect of the disclosure may be configured such that the first substrate and the second substrate have flexibility or bendability.

The liquid crystal display device according to one aspect of the disclosure may be configured such that the first substrate and the second substrate each include resin film substrates.

The liquid crystal display device according to one aspect of the disclosure may be configured such that the first polarizing plate is provided above the first substrate on a side opposite to the liquid crystal layer, and the transparent conductive film layer is disposed between the first substrate and the first polarizing plate.

The liquid crystal display device according to one aspect of the disclosure may be configured such that the first polarizing plate is provided above the first substrate on a side opposite to the liquid crystal layer, and the transparent conductive film layer is provided on the first polarizing plate on a side opposite to the first substrate.

The liquid crystal display device according to one aspect of the disclosure may be configured such that the transparent conductive film layer is disposed between the first substrate and the color filter layer.

The liquid crystal display device according to one aspect of the disclosure may be configured such that the transparent conductive film layer includes a conductive film and an underlayer and is bonded to the first polarizing plate with the underlayer interposed between the transparent conductive film layer and the first polarizing plate.

The liquid crystal display device according to one aspect of the disclosure may be configured such that the transparent conductive film layer is formed by coating.

Advantageous Effects of Disclosure

According to an aspect of the disclosure, it is possible to provide a liquid crystal display device that is capable of efficiently releasing charges accumulated in a liquid crystal panel and causes no adverse effect on display.

DESCRIPTION OF EMBODIMENTS

First Embodiment

A liquid crystal display device of a first embodiment of the disclosure will be described hereinafter.

Note that in each of the drawings below, the dimensional scale is illustrated differently depending on the component, such that each component is easily visible.

Figure 1:
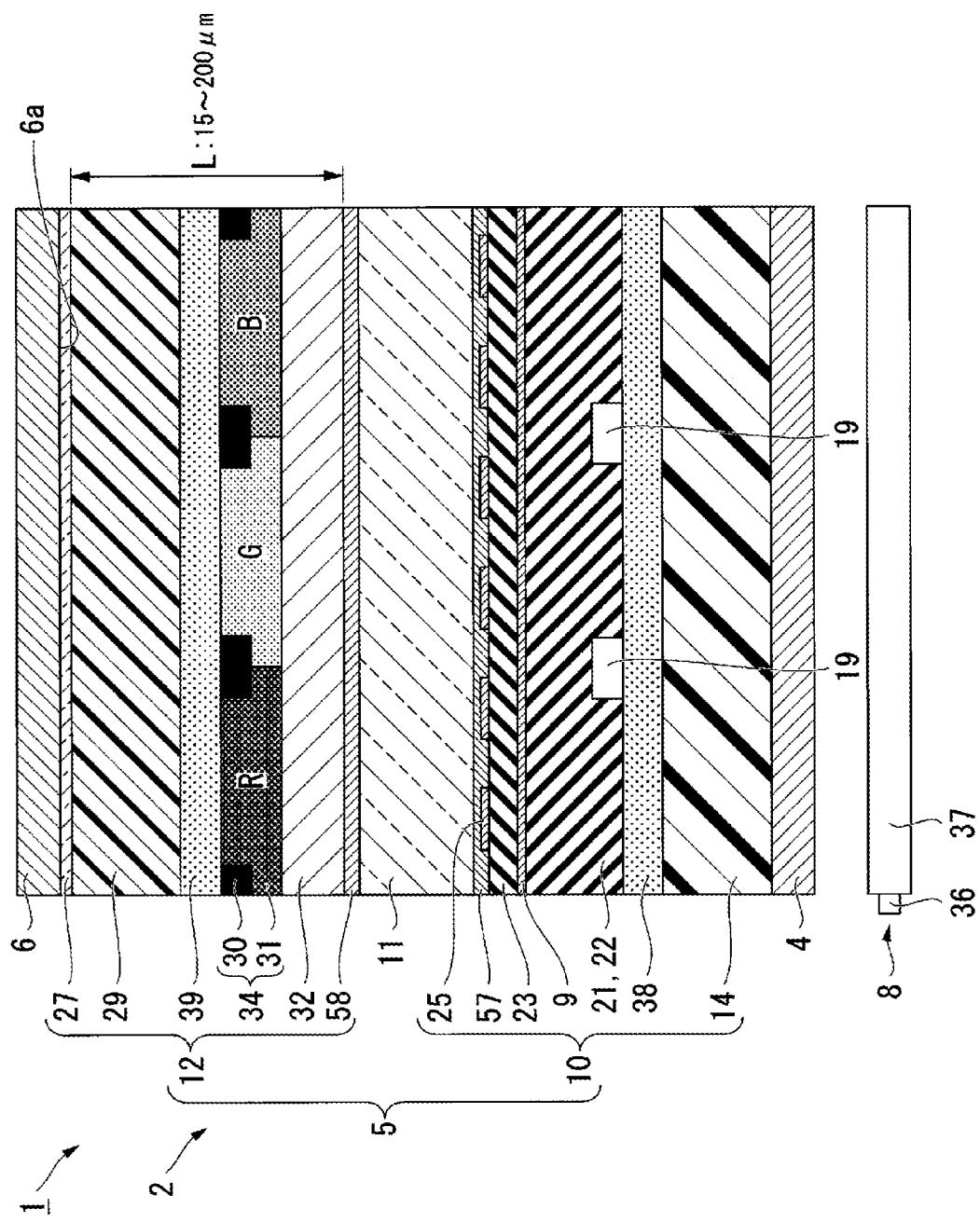
FIG. 1 is a cross-sectional view schematically illustrating a configuration of a liquid crystal display device according to a first embodiment.

FIG. 1 is a cross-sectional view schematically illustrating a configuration of a liquid crystal display device of the first embodiment.

A liquid crystal display device 1 of the present embodiment includes a liquid crystal panel 2 and a backlight unit 8.

The liquid crystal panel 2 includes a liquid crystal cell 5, an incidence-side polarizing plate (second polarizing plate) 4 provided on an incidence side of the liquid crystal cell 5, and an emission-side polarizing plate (first polarizing plate) 6 provided on an emission side of the liquid crystal cell 5. The liquid crystal panel 2 is a so-called flexible display with a display portion being deformable flexibly. In FIG. 1, the liquid crystal cell 5 is schematically illustrated but a detailed structure thereof will be described later.

As a material for the incidence-side polarizing plate 4 and the emission-side polarizing plate 6, a linear polarizing plate mass-manufactured by film manufactures can be used. For example, the plate is made from a cellulose triacetate (TAC) film, a polyvinyl alcohol (PVA) film, a zero-phase difference film having little phase difference, and the like. Further, a phase difference film (e.g., A plate and C plate) is added in some cases so as to compensate for viewing angle.

The flexible liquid crystal cell 5 of the present embodiment is composed of substantially the same components as those constituting a general liquid crystal display and in order to achieve flexibility, thin inorganic glass or a transparent resin film is used as a first substrate 29 and a second substrate 14. The liquid crystal cell 5 has a liquid crystal structure including thin film transistors (TFTs), various signal lines (scanning signal line, data signal line, or the like), pixel electrodes, a liquid crystal layer, a common electrode, a color filter layer, an insulating film, or the like, which are provided between a pair of substrates, namely the first substrate 29 and the second substrate 14. Well-known configurations and manufacturing methods can be applied to the above-described liquid crystal configuration. Note that the liquid crystal structure is not limited to the structure having a color filter layer.

The liquid display device 1 modulates light emitted from the backlight unit 8 at the liquid crystal panel 2 and displays a predetermined image, letter, or the like using the modulated light. A viewer views a display image of the liquid crystal display device 1 through the emission-side polarizing plate 6.

In the following description, the side where the emission-side polarizing plate 6 is disposed and the side where the backlight unit is disposed are referred as a viewing side and a back face side, respectively.

Next, a detailed configuration of the liquid crystal display device is described.

Liquid Crystal Panel

First, a configuration of the liquid crystal panel 2 is described.

The description is made of an active-matrix transmissive liquid crystal panel as an example. Note that a liquid crystal panel applicable to the present embodiment is not limited to the active matrix transmissive liquid crystal panel. The liquid crystal panel 2 applicable to the present embodiment can be, for example, a transflective (transmissive/reflective) liquid crystal panel. Alternatively, a simple matrix liquid crystal panel can be used, in which pixels do not include a switching thin film transistor. Hereinafter, the Thin Film Transistor is abbreviated as TFT.

Figure 2:
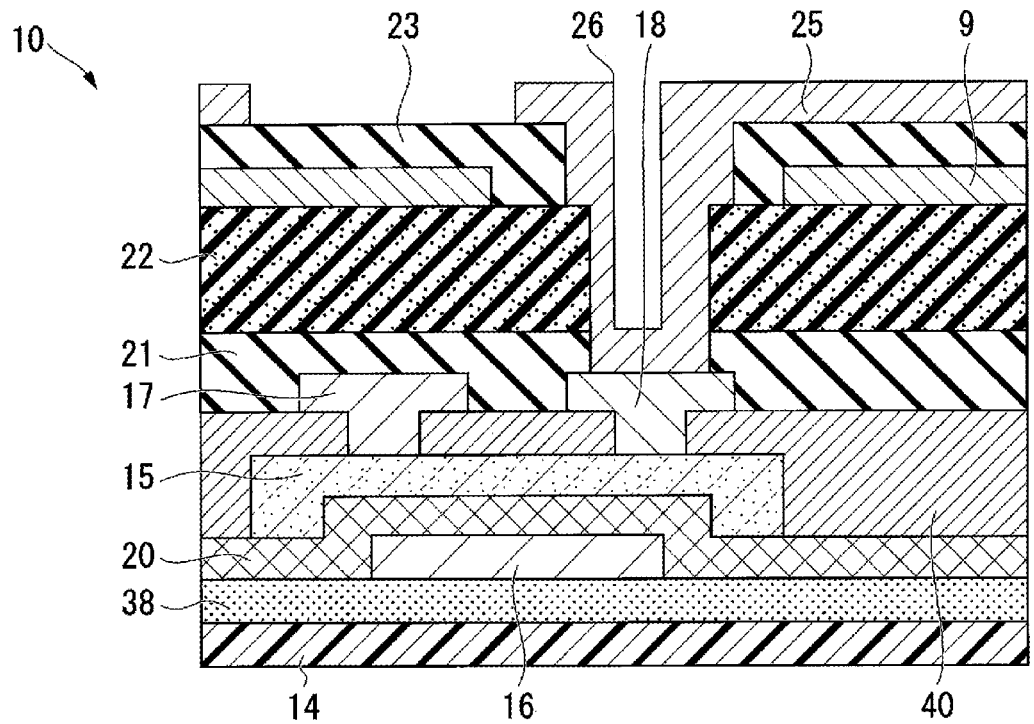
FIG. 2 is a cross-sectional view illustrating a configuration of a TFT configuration of a liquid crystal panel of the first embodiment.

FIG. 2 is a cross-sectional view illustrating a configuration of a TFT substrate of the liquid crystal panel of the first embodiment. Note that the following description is given with reference to FIG. 1 as well.

As illustrated in FIGS. 1 and 2, the liquid crystal panel 2 includes the liquid crystal cell 5, the incidence-side polarizing plate 4, and the emission-side polarizing plate 6.

Liquid Crystal Cell

The liquid crystal cell 5 includes a TFT substrate 10, a color filter substrate 12, and a liquid crystal layer 11 sandwiched therebetween. The TFT substrate 10 functions as a switching element substrate.

The liquid crystal layer 11 is sealed into a space enclosed by the TFT substrate 10, the color filter substrate 12, and a sealing member of a frame shape (not illustrated). The sealing member bonds the TFT substrate 10 and the color filter substrate 12 with a predetermined spacing.

The liquid crystal panel 2 displays an image in a horizontal alignment mode such as an In-Plane Switching (IPS) mode or a Fringe Field Switching (FFS) mode. The anisotropy of dielectric constant of the liquid crystal layer 11 can be either positive or negative.

A spacer (not illustrated) is provided between the TFT substrate 10 and the color filter substrate 12. The spacer is a spherical or columnar member. The spacer ensures a predetermined spacing between the TFT substrate 10 and the color filter substrate 12.

TFT Substrate

As illustrated in FIG. 2, the TFT substrate 10 includes the above-described second substrate 14, and bottom gate type TFT elements 19 each including a gate electrode 16, a semiconductor layer 15, a source electrode 17, a drain electrode 18, and the like, the TFT elements 19 being formed on a surface of the second substrate 14 closer to the liquid crystal layer 11.

As the second substrate 14, thin inorganic glass or a transparent resin film substrate can be used. As the transparent resin film substrate, a polymer material such as an organic transparent resin material having a thermal resistance such as polyimide (PI) can be used. In a case of using the transparent resin film substrate, the film thickness of the second substrate 14 can be set to about from 1 μm to 20 μm.

A base coat 38 is formed on one surface side of the second substrate 14. As the base coat 38, for example, an inorganic film such as a silicon nitride film (SiNx), a silicon oxynitride film (SiNO), or a silicon oxide film (SiO$_2$) is used.

The gate electrode 16 is formed on the base coat 38. As a material for the gate electrode 16, for example, a layered film of tungsten (W)/tantalum nitride (TaN), molybdenum (Mo), titanium (Ti), aluminum (Al), Cu or a layered film thereof is used.

On the base coat 38, a gate insulating film 20 is formed covering the gate electrode 16. As a material for the gate insulating film 20, for example, a silicon oxide film, a silicon nitride film, a layered film thereof, or the like is used.

On the gate insulating film 20, the semiconductor layer 15 is formed opposing the gate electrode 16. The semiconductor layer 15 is made of, for example, a quaternary mixed crystal semiconductor material containing indium (In), gallium (Ga), zinc (Zn), and oxygen (O). Conceivable examples of a material for the semiconductor layer 15 include a semiconductor material such as Continuous Gain Silicon (CGS), Low-temperature Poly-Silicon (LTPS), and Amorphous Silicon ($\alpha$-Si) as well as the In—Ga—Zn—O based quaternary mixed crystal semiconductor.

For example, in a case where Amorphous silicon ($\alpha$-Si) is used as a semiconductor material, contact layers (not illustrated) are formed on an upper surface of the semiconductor layer 15. Each of the contact layers is made of a material that is the same as the semiconductor layer 15 but is highly doped with n-type impurities. Of the semiconductor layer 15, a region between the two contact layers is formed with a small film thickness. A region with a small film thickness, of the semiconductor layer 15, functions as a channel region of the TFT element 19.

Also, in a case of using the quaternary mixed crystal semiconductor material containing indium (In), gallium (Ga), zinc (Zn), and oxygen (O) as a semiconductor material, for example, a contact layer (not illustrated) doped with n-type impurities is not necessary.

On the semiconductor layer 15, the source electrode 17 and the drain electrode 18 are formed with an etching stopper layer 40 as described later interposed therebetween. As a material of the source electrode 17 and the drain electrode 18, a conductive material similar to the above-described gate electrode 16 is used. The etching stopper layer (insulating film) 40 serves to protect the surfaces of the contact layer 28 and the semiconductor layer 15 in a case of the formation of the source electrode 17 and the drain electrode 18. As a material for the etching stopper layer 40, an inorganic film such as a silicon oxide film, a silicon nitride film, or a layered film thereof is used.

On the gate insulating film 20, a first interlayer insulating film (insulating film) 21 is formed covering the semiconductor layer 15, the source electrode 17, and the drain electrode 18. As a material for the first interlayer insulating film 21, an inorganic film such as a silicon oxide film, a silicon nitride film, or a layered film thereof is used similar to the etching stopper layer 40. On the first interlayer insulating film 21, a second interlayer insulating film (insulating film) 22 is formed.

As a material for the second interlayer insulating film 22, an inorganic film, for example, a silicon oxide film, a silicon nitride film, or a layered film thereof is used similar to the etching stopper layer 40, or an organic insulating material is used. In the present embodiment, the organic insulating material is used. On the second interlayer insulating film 22, a common electrode 9 is formed.

The common electrode 9 is formed into a flat plate shape substantially throughout the display region of the liquid crystal panel 2. On the common electrode 9, a third interlayer insulating film 23 is formed. The common electrode 9 is supplied with, for example, a common potential of 0 V.

As a material for the third interlayer insulating film 23, an inorganic film such as a silicon oxide film, a silicon nitride film, or a layered film thereof is used similar to the etching stopper layer 40.

A pixel electrode 25 is formed above the common electrode 9 with the third interlayer insulating film 23 interposed therebetween. The pixel electrode 25 is connected to the drain electrode 18 located on a lower layer side in a contact hole 26 extending through the first interlayer insulating film 21, the second interlayer insulating film 22, the third interlayer insulating film 23, and the common electrode 9. The pixel electrode 25 is connected to a drain region of the semiconductor layer 15 by using the drain electrode 18 as a relay electrode. With this configuration, when the TFT element 19 is turned on in response to a scanning signal supplied via a scanning line, an image signal supplied to the source electrode 17 via a signal line is supplied to the pixel electrode 25 through the semiconductor layer 15 and the drain electrode 18.

As materials for the pixel electrode 25 and the common electrode 9, a transparent conductive material such as Indium Tin Oxide (ITO), Indium Zinc Oxide (IZO), or the like may be used, or a reflective metal film such as aluminum, platinum, or nickel may be used.

On the entire surface of the third interlayer insulating film 23, an alignment film 57 (not illustrated in FIG. 2) is formed covering a plurality of pixel electrodes 25 and serves to align liquid crystal molecules almost horizontally with respect to the substrates 14 and 29.

Color Filter Substrate

As illustrated in FIG. 1, the color filter substrate 12 includes the first substrate 29, a base coat 39, a black matrix (color filter layer) 30, a color filter (color filter layer) 31, and an overcoat layer 32. The black matrix 30 and the RGB color filter 31 form the color filter layer 34.

As the first substrate 29, similar to the above-described second substrate 14, a thin inorganic glass substrate or a transparent resin film substrate can be used. As a material for the transparent resin film substrate, an organic transparent resin material having a thermal resistance such as polyimide (PI) can be used.

As the base coat 39, for example, an inorganic film such as a silicon nitride film (SiNx), a silicon oxynitride film (SiNO), and a silicon oxide film (SiO$_2$) are used.

The black matrix 30 has a function of shielding light passing through a pixel-to-pixel region. The black matrix 30 is made of, for example, chromium (Cr) or metal in the form of multilayer film of Cr/oxidized Cr, or the like, or a photoresist produced by dispersing carbon particles into a photosensitive resin.

The color filter 31 contains any one of pigments, red (R), green (G), and blue (B), for each of the subpixels different in color, which form one pixel. The color filter 31 of R, G, or B is provided opposing a corresponding one of the pixel electrodes 25 on the TFT substrate 10. Note that the color filter 31 may be of a multicolor configuration with three colors, RGB, or more.

For example, yellow (Y) or white (W) can be added to provide a four-color configuration, or yellow (Y), cyan (C), and magenta (M) can be added to provide a six-color configuration.

The overcoat layer 32 includes an insulating film covering the black matrix 30 and the color filter 31. The overcoat layer 32 has a function of reducing and leveling a step formed by the black matrix 30 and the color filter 31.

On the entire surface of the overcoat layer 32, an alignment film 58 is formed and functions to align liquid crystal molecules almost horizontally with respect to the respective substrates 14 and 29.

Incidence-Side Polarizing Plate and Emission-Side Polarizing Plate

The incidence-side polarizing plate 4 is provided on the backlight unit 8 side of the liquid crystal cell 5 (second substrate 14) and functions as a polarizer configured to control a polarization state of light incident on the liquid crystal cell 5. The emission-side polarizing plate 6 is provided on a viewing side of the liquid crystal cell 5 (first substrate 29) and functions as an analyzer configured to control a light transmissive state of light emitted from the liquid crystal cell 5. An absorption axis of the incidence-side polarizing plate 4 and an absorption axis of the emission-side polarizing plate 6 are in a crossed-Nicol arrangement.

With such a positional relationship, the liquid crystal display device 1 functions as a liquid crystal display device having a mode called a normally black mode in which a black image is displayed when no electric field is applied and a white image is displayed when an electric field is applied.

In the present embodiment, a transparent conductive film layer 27 is formed on a surface 6a of the emission-side polarizing plate 6 closer to the liquid crystal cell 5. The transparent conductive film layer 27 is connected to a ground potential and functions to prevent accumulation of static electricity (charges) inside the liquid crystal panel 2 during a manufacturing process.

As a material for the transparent conductive film layer 27, a transparent conductive material such as ITO, metal nanowire or conductive polymer is used. A method of forming the transparent conductive film layer 27 is not limited to a coating method, and a transfer method or the like may be used. Especially, in a case of using a thin inorganic glass substrate, a sputtering method can be used. The emission-side polarizing plate 6 including the transparent conductive film layer 27 is bonded to the first substrate 29 of the liquid crystal cell 5 on the viewing side with an adhesive or the like (not illustrated) therebetween.

In the present embodiment, as illustrated in FIG. 1, a distance L between the transparent conductive film layer 27 and the liquid crystal layer 11, that is, the distance L between an interface between the liquid crystal layer 11 and the overcoat layer 32 and an interface between the transparent conductive film layer 27 and the first substrate 29 ranges from 15 µm to 200 µm. Specifically, the transparent conductive film layer 27 is formed at a position away from the liquid crystal layer 11 toward the color filter substrate 12 by a distance of 15 µm to 200 µm.

Backlight Unit

As illustrated in FIG. 1, the backlight unit 8 includes a light source 36 and a light guide 37. The light source 36 is provided at an end face of the light guide 37. As the light source 36, for example, a light emitting diode, a cold cathode tube, and the like are used. The backlight unit 8 of the present embodiment is of an edge light type.

The light guide 37 has a function of guiding light emitted from the light source 36 to the liquid crystal panel 2. As a material for the light guide 37, for example, a resin material such as an acrylic resin is used.

The light that is emitted from the light source 36 and incident on the end face of the light guide 37 propagates while totally reflecting on the interior of the light guide 37 and then, exits the upper surface (light emitting surface) of the light guide 37 with substantially uniform intensity.

Although not illustrated in the present embodiment, on the upper surface of the light guide 37, a diffuser sheet and a prism sheet are disposed, while on the lower surface of the light guide 37, a diffuser sheet is disposed. The light emitted from the upper surface of the light guide 37 is scattered by the diffuser sheet and then condensed by the prism sheet into substantially parallel beams and allowed to exit. As the diffuser sheet, a white PET can be used. As the prism sheet, for example, BEF sheet (trade name) available from Sumitomo 3M Limited can be used.

As the backlight unit 8, a backlight is used in which the emission direction of the light is controlled to have a relatively moderate directivity. Note that the backlight unit 8 does not need to have directivity.

Figure 3:
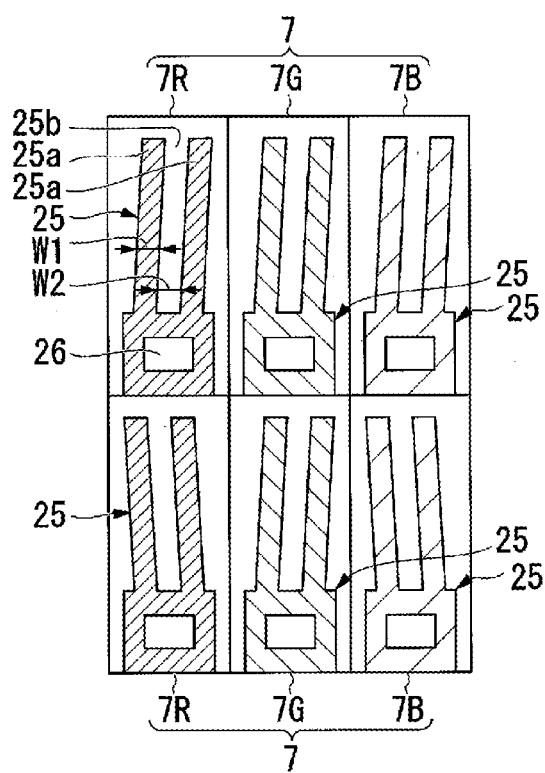
FIG. 3 is a plan view illustrating a configuration of the respective pixels in a display region of the liquid crystal panel.

FIG. 3 is a plan view illustrating the configuration of the respective pixels in a display region of the liquid crystal panel.

One pixel 7 is composed of three pixels 7R, 7G, and 7B corresponding to RGB.

The respective pixels 7R, 7G, and 7B correspond to regions surrounded by the scanning line signals and the data line signals and are each equipped with the pixel electrode 25 and the TFT element 19 (see FIG. 1).

The pixel electrode 25 has a comb shape that is open at one end of a slit. It is preferred that a width W1 in a short-hand direction of each comb teeth portion 25a range from 1.5 µm to 3.5 µm. A slit width W2 of a portion (slit) 25b between adjacent comb teeth portions 25a preferably ranges from 2.5 µm to 4.5 µm. The slit width W2 of less than 2.5 µm provides a possibility that a substantial transmissive portion is reduced, while the slit width of greater than 4.5 µm provides a possibility that a fringe electric field is weakened and liquid crystal molecules require more time to switch.

In the present embodiment, the respective pixel electrodes 25 have two comb teeth portions 25a, but the number of comb teeth portions 25a is not limited thereto and can be appropriately selected. Preferably, two to four comb teeth portions 25a are provided.

In a flexible liquid crystal panel, it is necessary to reduce the thickness of the first substrate 29 in order to ensure flexibility. The inventors of the disclosure have found such a phenomenon that in a case of reducing the thickness of the first substrate 29 so as to satisfy the flexibility requirements, a display quality is adversely affected. Details are described below.

Figure 4:
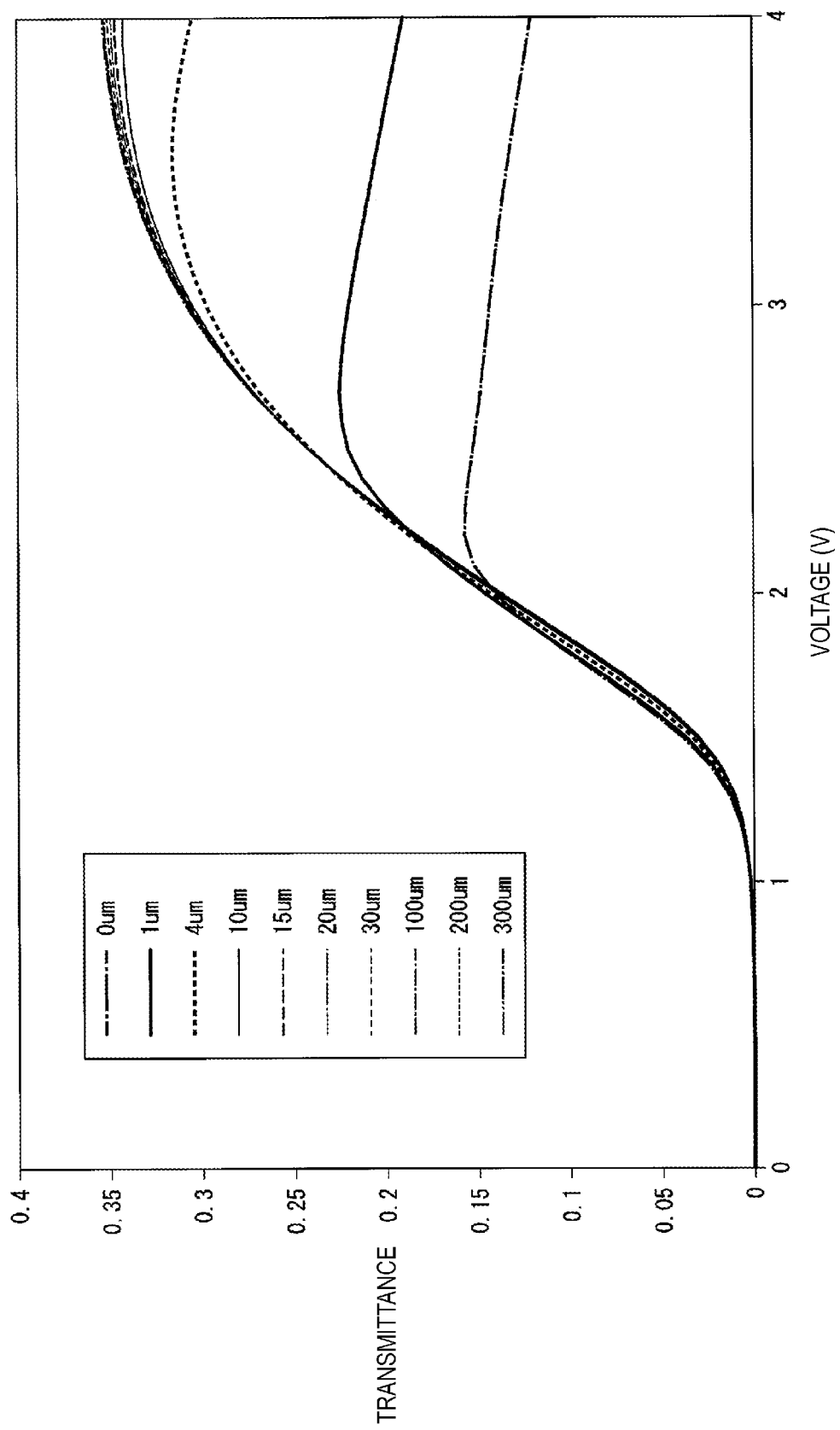
FIG. 4 is a graph showing VT characteristics obtained by simulation with a liquid crystal display device.
Figure 5:
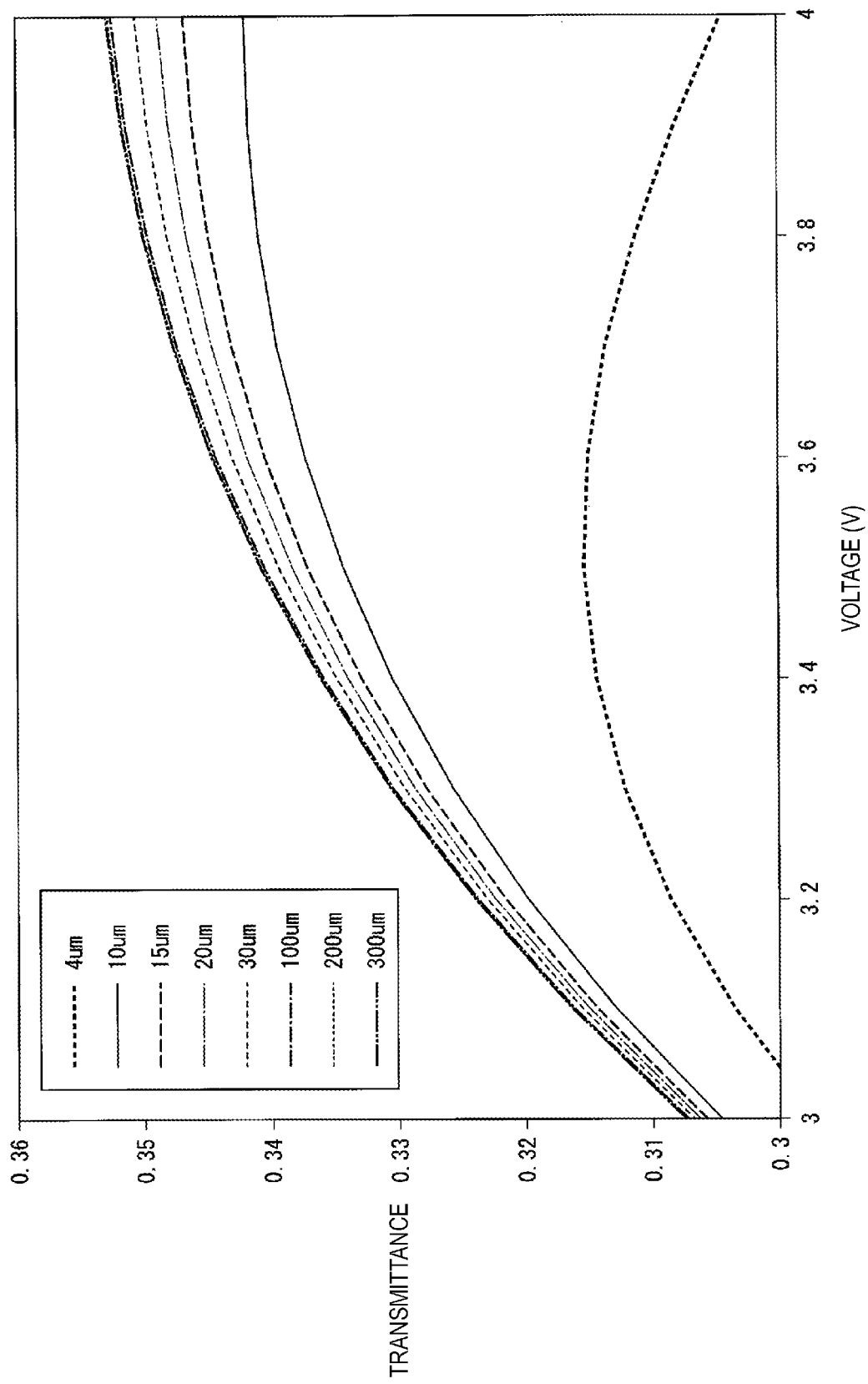
FIG. 5 is an enlarged view of part of the graph in FIG. 4.
Figure 6:
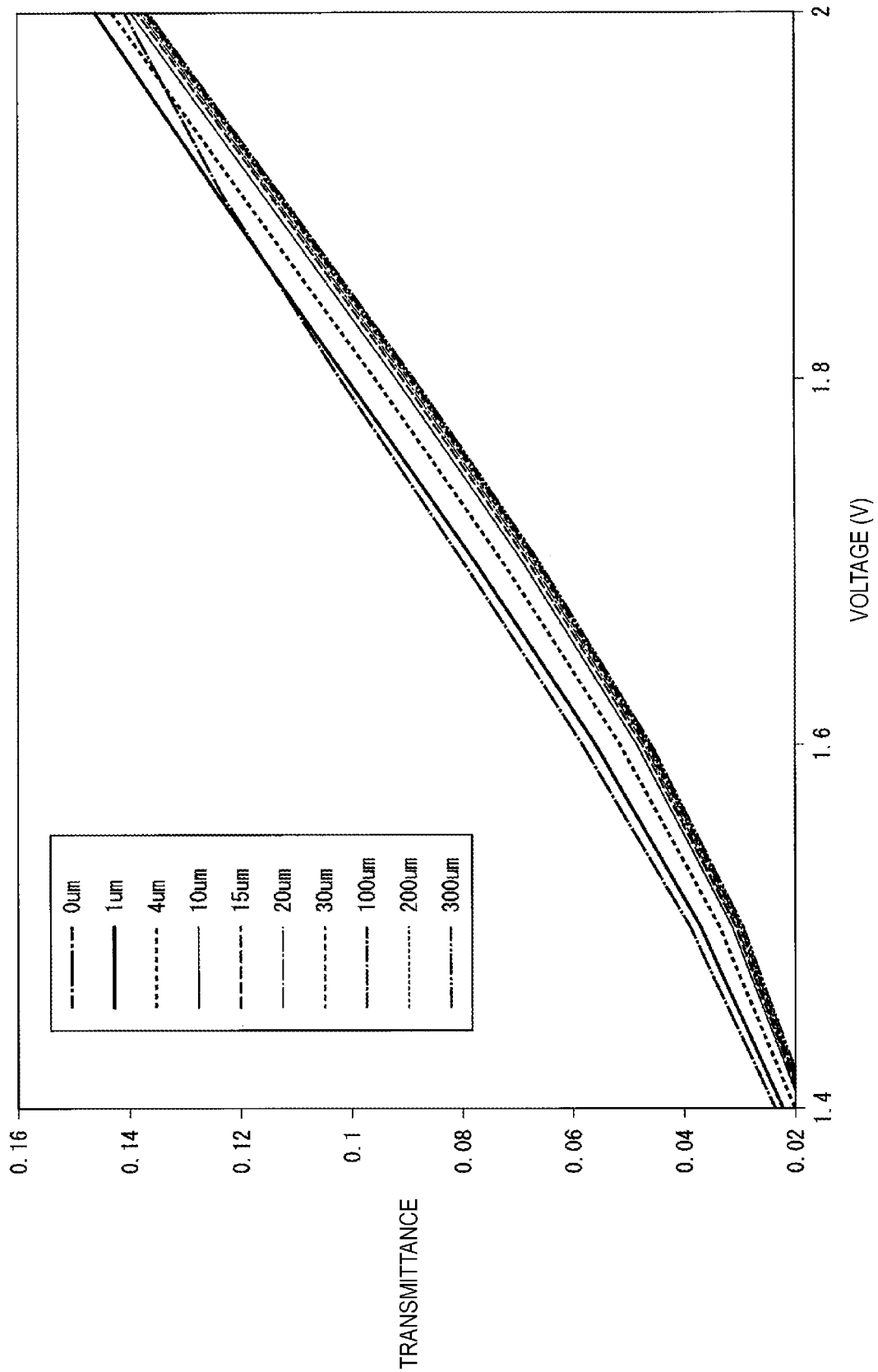
FIG. 6 is an enlarged view of part of the graph in FIG. 4.

FIG. 4 is a graph showing VT characteristics obtained by simulation with the liquid crystal display device 1. In FIG. 4, the vertical axis indicates a transmittance (T) and the horizontal axis indicates voltage (V). A parameter is the distance L from the liquid crystal layer 11 to the transparent conductive film layer 27, and the distance L is assumed to range from 0 µm to 300 µm. FIG. 5 is an enlarged view of part of the graph of FIG. 4, which illustrates values of transmittance at voltage of 3 V to 4 V. FIG. 6 is an enlarged view of part of the graph of FIG. 4, which illustrates values of transmittance at voltage of 1.4 V to 2.0 V.

In the present embodiment, the common electrode 9 is fixed to 0 V, the voltage of the pixel electrode 25 varies in a range from 0 V to 4 V, and a liquid crystal application voltage is from 0 V to 4 V. A potential of the transparent conductive film layer 27 is 0 V, equal to a common potential. The unit for the transmittance is freely set.

The distance L of 0 µm from the liquid crystal layer 11 to the transparent conductive film layer 27 is not practically realized in an actual manufacturing process, but this indicates that the liquid crystal layer 11 is in contact with the transparent conductive film layer 27. The distance L of 300

μm from the liquid crystal layer 11 to the transparent conductive film layer 27 is based on the fact that a liquid crystal panel substrate of a horizontal alignment mode, currently available over the world, employs inorganic glass with the thickness of about several hundred μm. This value is used as a reference value.

In a case where the liquid crystal layer 11 has a small distance from the transparent conductive film layer 27, the transparent conductive film layer 27 disposed near the color filter substrate 12 affects alignment of liquid crystal, resulting in insufficient transmittance even when a voltage is applied. In conclusion, display is adversely affected.

On the other hand, as the distance L between the liquid crystal layer 11 and the transparent conductive film layer 27 is increased close to the reference value, 300 μm, an effect on display is reduced and finally eliminated.

Table 1 shows transmittance ratios at different voltages (0 V, 2 V, 3 V, and 4 V) according to the distance L from the liquid crystal layer 11 to the transparent conductive film layer 27 (0 μm to 300 μm) and a voltage corresponding to a maximum transmittance (Max.).

TABLE 1

| | | Distance L from liquid crystal layer to transparent conductive film layer | | | | | | | | |
|---|---|---|---|---|---|---|---|---|---|---|
| | | 0 μm | 1 μm | 4 μm | 10 μm | 15 μm | 20 μm | 30 μm | 100 μm | 200 μm | 300 μm |
| Transmittance ratios at different voltages (relative to transmittance at 300 μm) | 0 V | 1.00 | 1.00 | 1.00 | 1.00 | 1.00 | 1.00 | 1.00 | 1.00 | 1.00 | 1.00 |
| | 2 V | 1.03 | 1.07 | 1.04 | 1.02 | 1.01 | 1.01 | 1.00 | 1.00 | 1.00 | 1.00 |
| | 3 V | 0.47 | 0.72 | 0.97 | 0.99 | 0.99 | 1.00 | 1.00 | 1.00 | 1.00 | 1.00 |
| | 4 V | 0.34 | 0.54 | 0.86 | 0.97 | 0.98 | 0.99 | 0.99 | 1.00 | 1.00 | 1.00 |
| Voltage corresponding to transmittance Max | | 2.2 V | 2.7 V | 3.5 V | 3.9 V | 4.0 V | 4.0 V | 4.0 V | 4.0 V | 4.0 V | 4.0 V |

As shown in Table 1, in a case where the distance L from the liquid crystal layer 11 to the transparent conductive film layer 27 is 10 μm or less, a voltage corresponding to a maximum transmittance is 3.9 V or less, whereby a transmittance is inverted (lowered) until the voltage reaches a preset white voltage of 4.0 V.

In a case where a distance L from the liquid crystal layer 11 to the transparent conductive film layer 27 is 15 μm or greater, the transmittance is maximized and not inverted when the voltage reaches the preset white voltage of 4.0 V.

Furthermore, assuming that values of transmittance at different voltages at the distance L of 300 μm from the liquid crystal layer 11 to the transparent conductive film layer 27 are used as a reference, when transmittance ratios at different voltages (0 V, 2 V, 3 V, and 4 V) with the distance L of 20 μm, 30 μm, 100 μm, and 200 μm from the liquid crystal layer 11 to the transparent conductive film layer 27 are compared, their differences are 1% or less.

In a case where the liquid crystal layer 11 is close to the transparent conductive film layer 27 such that the distance L from the liquid crystal layer 11 to the transparent conductive film layer 27 is 10 μm or less, comparison between the transmittance at a corresponding voltage and the transmittance at the distance L of 300 μm shows a large difference.

From the foregoing, it is concluded that in order to prevent adverse effect on display, the distance L from the liquid crystal layer 11 to the transparent conductive film layer 27 is set to 15 μm or greater, preferably 20 μm or greater, that is, the liquid crystal layer 11 and the transparent conductive film layer 27 are required to be away from each other.

As apparent from Table 1, as the distance L from the liquid crystal layer 11 to the transparent conductive film layer 27 increases, an effect of the electric field from the transparent conductive film layer 27 is reduced and thus, a difference from the transmittance at the reference value, 300 μm, is reduced.

A large number of liquid crystal panels with inorganic glass substrates, currently available over the world, have the specifications with flexibility or bendability.

According to the configuration of the present embodiment, a display with a convex type curved liquid crystal panel of a cylindrical or semi-cylindrical shape can be achieved utilizing the flexibility or bendability of the second substrate 14 and the first substrate 29. When the curvature radius of the liquid crystal panel is 500 mm, a display range widens to about 150 degrees and therefore, the panel is largely curved forward to enable display of images with three-dimensional sensation.

To achieve such a display, in the present embodiment, such a range in which the first substrate 29 has flexibility or bendability is defined as an upper limit of the distance L.

Figure 7:
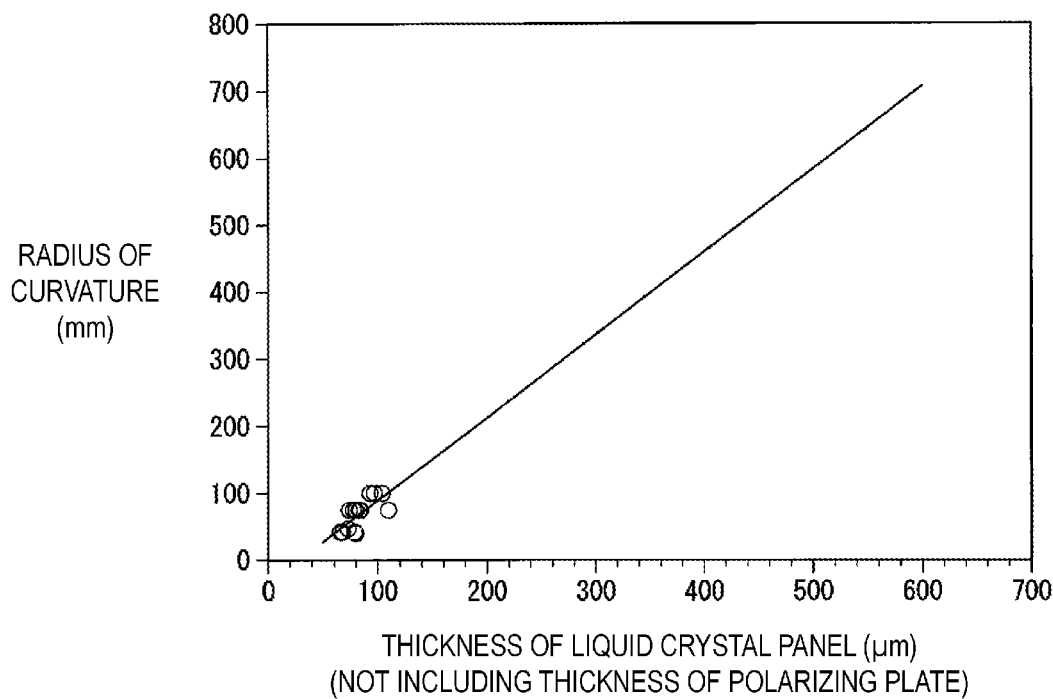
FIG. 7 is a graph showing a relationship between a thickness of a liquid crystal panel and a radius of curvature that provides no display unevenness.

FIG. 7 is a graph showing a relationship between the thickness of the liquid crystal panel 2 and the radius of curvature of the liquid crystal panel 2 that causes no display unevenness. In FIG. 7, the vertical axis indicates the radius of curvature (mm) and the horizontal axis indicates the thickness of the liquid crystal panel 2 (μm). Note that the thickness of the liquid crystal panel 2 includes the thicknesses of the TFT substrate 20 (the second substrate 14 and a layered film closer to the second substrate 14), the liquid crystal layer 11, and the color filter substrate 12 (the first substrate 29 and a layered film closer to the first substrate 29) but excludes the thickness of the emission-side polarizing plate 6.

In FIG. 7, actually measured values are plotted and extrapolation based on the measured values is indicated by black line. The measured sample substrate is made of thin inorganic glass, and the TFT substrate 10 and the color filter substrate 12 have the same thickness.

As shown in FIG. 7, in a case where the liquid crystal panel 2 includes an inorganic glass substrate, the thickness of the liquid crystal panel 2 satisfying the radius of curvature of 500 mm or less is 432 μm. Because the TFT substrate 10 and the color filter substrate 12 have the same thickness, an upper limit, of the distance L from the liquid crystal layer 11 to the transparent conductive film layer 27, is defined as about 200 μm.

Even an inorganic glass substrate can realize the radius of curvature of 500 mm for the liquid crystal panel 2 as long as the substrate is relatively thin, that is, the substrate has a small thickness, which allows the formation of the liquid crystal panel 2 with the thickness of 432 μm or less. Thus, even a liquid crystal panel with the inorganic glass substrate can provide a curved liquid crystal panel having flexibility or bendability. In a case of using a resin film substrate as the substrate of the liquid crystal panel, the thickness of the liquid crystal panel can be further reduced and also, the radius of curvature can be further reduced.

According to the above-described liquid crystal display device 1 of the present embodiment, the transparent conductive film layer 27 set at a ground potential is provided near the color filter substrate 12. This allows charges accumulated in the liquid crystal panel to be efficiently released. Moreover, the transparent conductive film layer 27 disposed at a position away from the liquid crystal layer 11 by a distance of 15 µm to about 200 µm causes no adverse effect on the display and enables the liquid crystal display device 1 to have high display quality.

Second Embodiment

Next, a liquid crystal display device according to a second embodiment of the disclosure is described.

The following basic configuration of the liquid crystal display device according to the second embodiment is substantially the same as that of the first embodiment except the configuration of a transparent conductive film layer. Thus, the following description will discuss in detail the difference from the first embodiment and will not discuss the same components. In the drawings referenced in the following description, the same components as those in FIGS. 1 to 7 are denoted by the same reference numerals.

Figure 8:
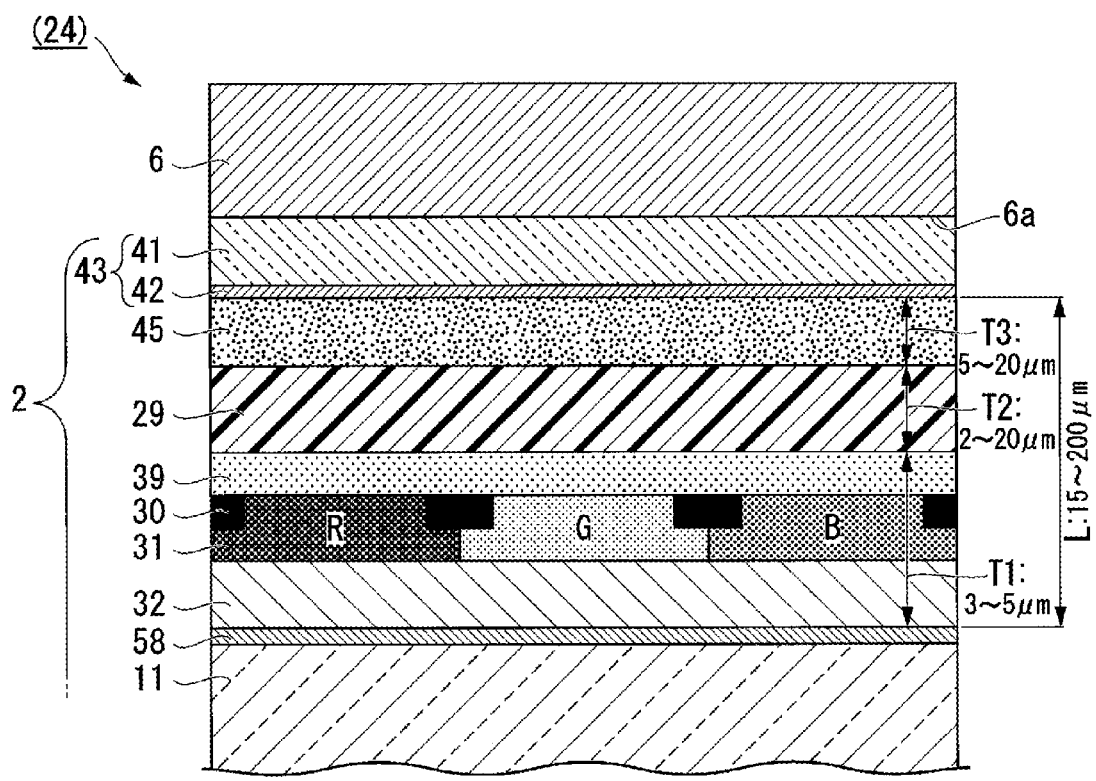
FIG. 8 is a cross-sectional view illustrating a schematic configuration of a liquid crystal display device according to a second embodiment.

FIG. 8 is a cross-sectional view schematically illustrating the configuration of the liquid crystal display device of the second embodiment.

Note that the TFT substrate 10 has the same configuration as that of the first embodiment and is not illustrated in FIG. 8.

As illustrated in FIG. 8, the liquid crystal display device 24 of the present embodiment includes a transparent conductive film layer 43 having an underlayer 41 and a conductive film 42. The transparent conductive film layer 43 is formed in advance on the emission-side polarizing plate 6, and the underlayer 41 and the conductive film 42 are layered in this order on a surface 6a of the emission-side polarizing plate 6. The underlayer 41 and the conductive film 42 can be formed by transfer, coating, and sputtering.

Note that in a case of forming the conductive film 42 by coating, the underlayer 41 is not required.

The underlayer 41 is preferably in close contact with the surface 6a of the emission-side polarizing plate 6 closer to the liquid crystal panel 2. As a material for the underlayer 41, a material capable of transmitting light is used. For example, an organic resin is applicable. As a material for the conductive film 42, a transparent, conductive material is applicable. Conceivable examples thereof include a transparent conductive material such as Indium Tin Oxide (ITO), Indium Zinc Oxide (IZO), metal nanowire, and conductive polymer.

In the present embodiment, the emission-side polarizing plate 6 including the transparent conductive film layer 43 on a surface thereof is prepared in advance and then is bonded to the liquid crystal panel 2 with an adhesive layer 45 provided on the conductive film 42 or on the first substrate 29 of the liquid crystal panel 2 therebetween.

In this way, the liquid crystal display device 24 of the present embodiment is configured.

In the present embodiment, to ensure the distance L of 15 µm to 200 µm from the liquid crystal layer 11 to the conductive film 42, the thickness of the adhesive layer 45 for bonding the emission-side polarizing plate 6 and the liquid crystal panel 2 is adjusted to thereby ensure a required distance.

The thicknesses of the respective components are listed below as an example.

Thickness T1 of a layered film (overcoat layer 32, color filter 31, black matrix 30, and base coat 39) on the first substrate 29: 3.0 µm to 5.0 µm Thickness T2 of the first substrate 29 (transparent resin film substrate): 2.0 µm to 20 µm Thickness T3 of the adhesive layer 45: 5.0 µm to 20 µm By adjusting the above-described thicknesses, the distance L of 15 µm to 200 µm from the liquid crystal layer 11 to the conductive film 42 can be ensured.

The above "described dimensions" are given for reference, and these reference values are derived from general values. The point is that the dimensions are only intended to ensure the distance L of 15 µm to 200 µm from the liquid crystal layer 11 to the transparent conductive film layer 43 and not intended to define the film thickness of each of the components.

Third Embodiment

Next, a liquid crystal display device according to a third embodiment of the disclosure is described.

The following basic configuration of the liquid crystal display device of the present embodiment is substantially the same as that of the second embodiment except that a polarizing plate is bonded to a liquid crystal panel including a transparent conductive film layer. Thus, the following description will discuss in detail the difference from the second embodiment and will not discuss the same components. In the drawings referenced in the following description, the same components as those in FIGS. 1 to 7 are denoted by the same reference numerals.

Although the second embodiment discusses the configuration in which the emission-side polarizing plate including a transparent conductive film is bonded to the liquid crystal panel, in the present embodiment, a transparent conductive film is formed on the liquid crystal panel side, not on the emission-side polarizing plate side.

Figure 9:
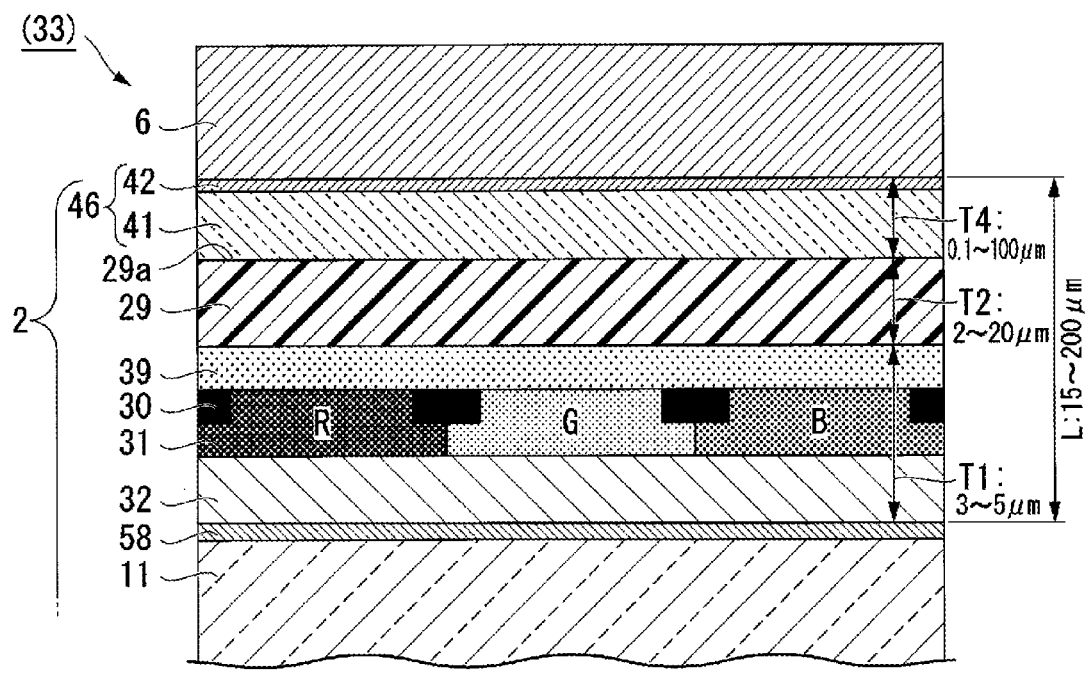
FIG. 9 is a cross-sectional view illustrating a schematic configuration of a liquid crystal display device according to a third embodiment.

FIG. 9 is a cross-sectional view illustrating a schematic configuration of the liquid crystal display device of the third embodiment.

Note that the TFT substrate 10 has the same configuration as that of the first embodiment and thus is not illustrated in FIG. 9.

As illustrated in FIG. 9, a liquid crystal display device 33 of the present embodiment includes a transparent conductive film layer 46 provided on a surface (a surface on a viewer side) of the first substrate 29 of the liquid crystal panel 2 opposite to the liquid crystal layer 11.

The transparent conductive film layer 46 is composed of the underlayer 41 and the conductive film 42 as in the second embodiment. The underlayer 41 and the conductive film 42 are formed in this order on an outer surface 29a of the first substrate 29, and can be formed by transfer, coating, sputtering, or the like.

Note that in a case of forming the conductive film 42 by coating, the underlayer 41 is not required.

In general, an adhesive is applied in advance to a mass-manufactured polarizing plate so as to bond to the liquid crystal panel 2, and the adhesive is included in the components of the polarizing plate. Hence, it is unnecessary to further add an adhesive to the polarizing plate, resulting in reductions in time and cost. Moreover, in the present embodiment, the underlayer 41 is disposed between the liquid crystal layer 11 and the conductive film 42 and thus, only the emission-side polarizing plate 6 is located outside of the conductive film 42 (on the viewing side). Because the underlayer 41 is one of the components that contribute to control of the distance L, the size can be further reduced compared with the configuration of the second embodiment.

The thicknesses of the respective components in the present embodiment are listed below as an example.

Thickness T1 of a layered film (overcoat layer 32, color filter 31, black matrix 30, and base coat 39) on the first substrate 29: 3.0 μm to 5.0 μm Thickness T2 of the first substrate 29 (transparent resin film substrate): 2.0 μm to 20 μm Thickness T4 of the transparent conductive film layer 46: 0.1 μm to 100 μm By adjusting the above-described thicknesses, the distance L of 15 μm to 200 μm from the liquid crystal layer 11 to the conductive film 42 can be ensured.

Here, the wide range of thickness of the transparent conductive film layer 46 suggests that, for example, when formed by coating, the film might have the thickness of about 0.1 μm after dried, and when the transparent conductive film layer 46 is formed by transfer, its thickness can be adjusted by changing the thickness of the underlayer 41.

The above-described dimensions are given for reference, and these reference values are derived from general values. The point is that the dimensions are only intended to ensure the distance L from the liquid crystal layer 11 to the transparent conductive film layer 43, not intended to define the film thickness of each of the components.

Fourth Embodiment

Next, a liquid crystal display device according to a fourth embodiment of the disclosure is described.

The following basic configuration of the liquid crystal display device of the present embodiment is substantially the same as that of the first embodiment except that a transparent conductive film layer is provided outside the polarizing plate. Thus, the following description will discuss in detail the difference from the first embodiment and will not discuss the same components. In the drawings referenced in the following description, the same components as those in FIGS. 1 to 7 are denoted by the same reference numerals.

Figure 10:
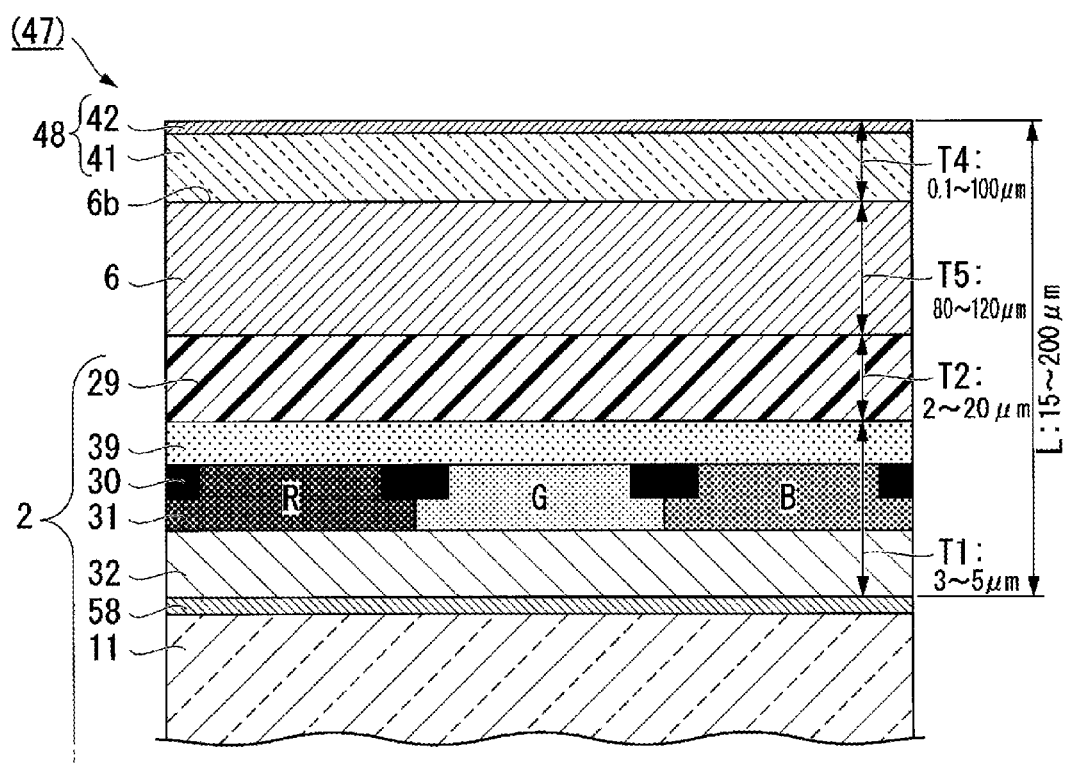
FIG. 10 is a cross-sectional view illustrating a schematic configuration of a liquid crystal display device according to a fourth embodiment.

FIG. 10 is a cross-sectional view schematically illustrating the configuration of the liquid crystal display device of the fourth embodiment.

Note that the TFT substrate 10 has the same configuration as that of the first embodiment and is not illustrated in FIG. 10.

As illustrated in FIG. 10, in a liquid crystal display device 47 of the present embodiment, a transparent conductive film layer 48 is provided on the emission-side polarizing plate 6 on a side opposite to the first substrate 29. The transparent conductive film layer 48 is composed of the underlayer 41 and the conductive film 42 as in the second and third embodiments. The underlayer 41 and the conductive film 42 are formed in this order on a surface 6b of the emission-side polarizing plate 6 and can be formed by transfer, coating, sputtering, or the like.

Note that in a case of forming the conductive film 42 by coating, the underlayer 41 is not required.

The emission-side polarizing plate 6 including the transparent conductive film layer 48 is bonded to the first substrate 29 of the liquid crystal panel 2 by use of an adhesive or the like originally contained as one of the components of the polarizing plate.

In the present embodiment, the transparent conductive film layer 48 is formed in advance on the emission-side polarizing plate 6. However, the following example is also applicable: after only the emission-side polarizing plate 6 is bonded to the liquid crystal panel 2, the transparent conductive film layer 48 is bonded onto the surface 6b of the emission-side polarizing plate 6 on the viewing side.

The thicknesses of the respective components in the present embodiment are listed below as an example.

Thickness T1 of a layered film (overcoat layer 32, color filter 31, black matrix 30, and base coat 39) on the first substrate 29: 3.0 μm to 5.0 μm Thickness T2 of the first substrate 29 (transparent resin film substrate): 2.0 μm to 20 μm Thickness T5 of the emission-side polarizing plate 6: 80 μm to 120 μm Thickness T4 of the underlayer 41 of the transparent conductive film layer 46: 0.1 μm to 100 μm By adjusting the above-described thicknesses, the distance L of 15 μm to 200 μm from the liquid crystal layer 11 to the conductive film 42 can be ensured.

According to the configuration of the present embodiment, no component exits outside (viewing side) the conductive film 42, and almost all the components located closer to the viewing side than the liquid crystal layer 11 are present between the liquid crystal layer 11 and the conductive film 42. This enables further size reduction compared with the configuration of the third embodiment.

Fifth Embodiment

Next, a liquid crystal display device according to a fifth embodiment of the disclosure is described.

The following basic configuration of the liquid crystal display device of the present embodiment is substantially the same as that of the first embodiment except that a transparent conductive film layer is provided between the color filter layer and the first substrate. Thus, the following description will discuss in detail the difference from the first embodiment and will not discuss the same components. In the drawings referenced in the following description, the same components as those in FIGS. 1 to 7 are denoted by the same reference numerals.

Figure 11:
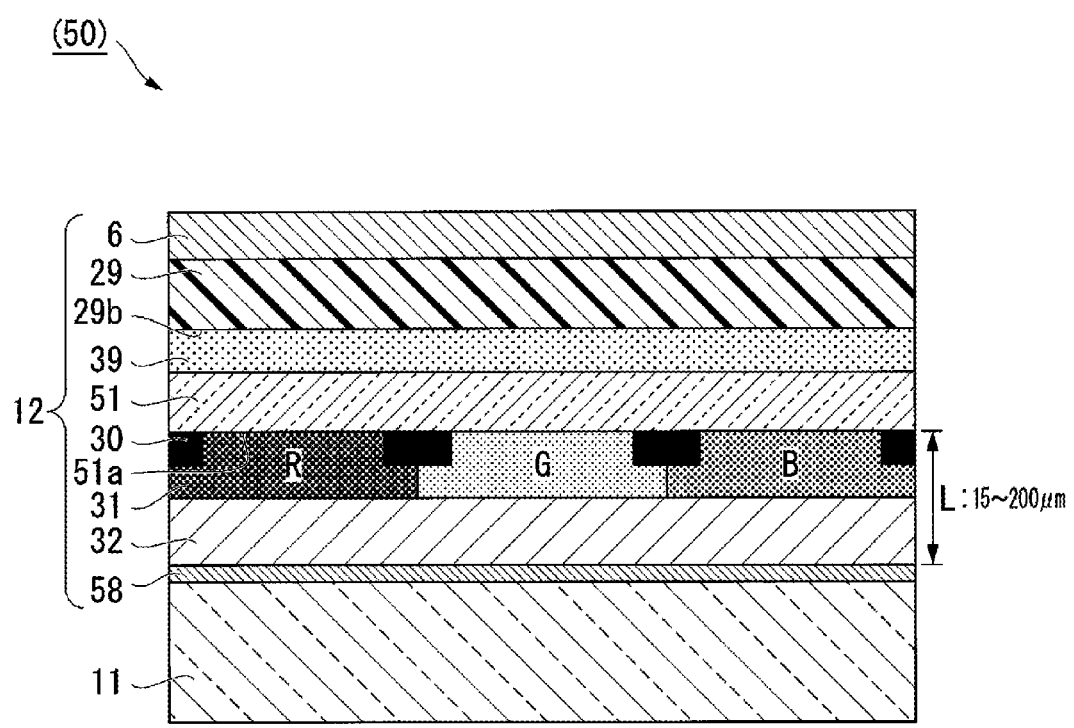
FIG. 11 is a cross-sectional view illustrating a schematic configuration of a liquid crystal display device according to a fifth embodiment.

FIG. 11 is a cross-sectional view schematically illustrating the configuration of the liquid crystal display device of the fifth embodiment.

Note that the TFT substrate 10 has the same configuration as that of the first embodiment and is not illustrated in FIG. 10.

As illustrated in FIG. 11, in a liquid crystal display device 50 of the present embodiment, a transparent conductive film layer 51 is provided between the liquid crystal layer 11 and the first substrate 29 of the color filter substrate 12. A base coat 39 is provided on an inner surface 29b of the first substrate 29 closer to the liquid crystal layer 11, and the transparent conductive film layer 51 is formed by sputtering or the like, so as to cover almost all the surface of the base coat 39. The black matrix 30, the color filter 31, and the overcoat layer 32 are formed in order on a surface 51a of the transparent conductive film layer 51 closer to the liquid crystal layer 11. In the present embodiment as well, the distance L from the liquid crystal layer 11 to the transparent conductive film layer 51 is in a range from 15 μm to 200 μm.

The transparent conductive film layer 51 can be formed by the same method as an existing method of forming a common electrode on the color filter substrate side when manufacturing a liquid crystal panel of a vertical alignment mode or a TN mode except that the distance from the liquid crystal layer 11 to the transparent conductive film layer 51 is required to be set to 15 μm or greater.

Preferred embodiments of the disclosure were described above with reference to the attached drawings, but it goes without saying that the disclosure is not limited to these examples. It will be clear to a person skilled in the art that various modifications and amendments can be imagined within the scope of the technical ideas described in the Scope of the Patent Claims, and it is understood that these modifications and amendments also obviously fall under the technical scope of the disclosure.

Figure 12:
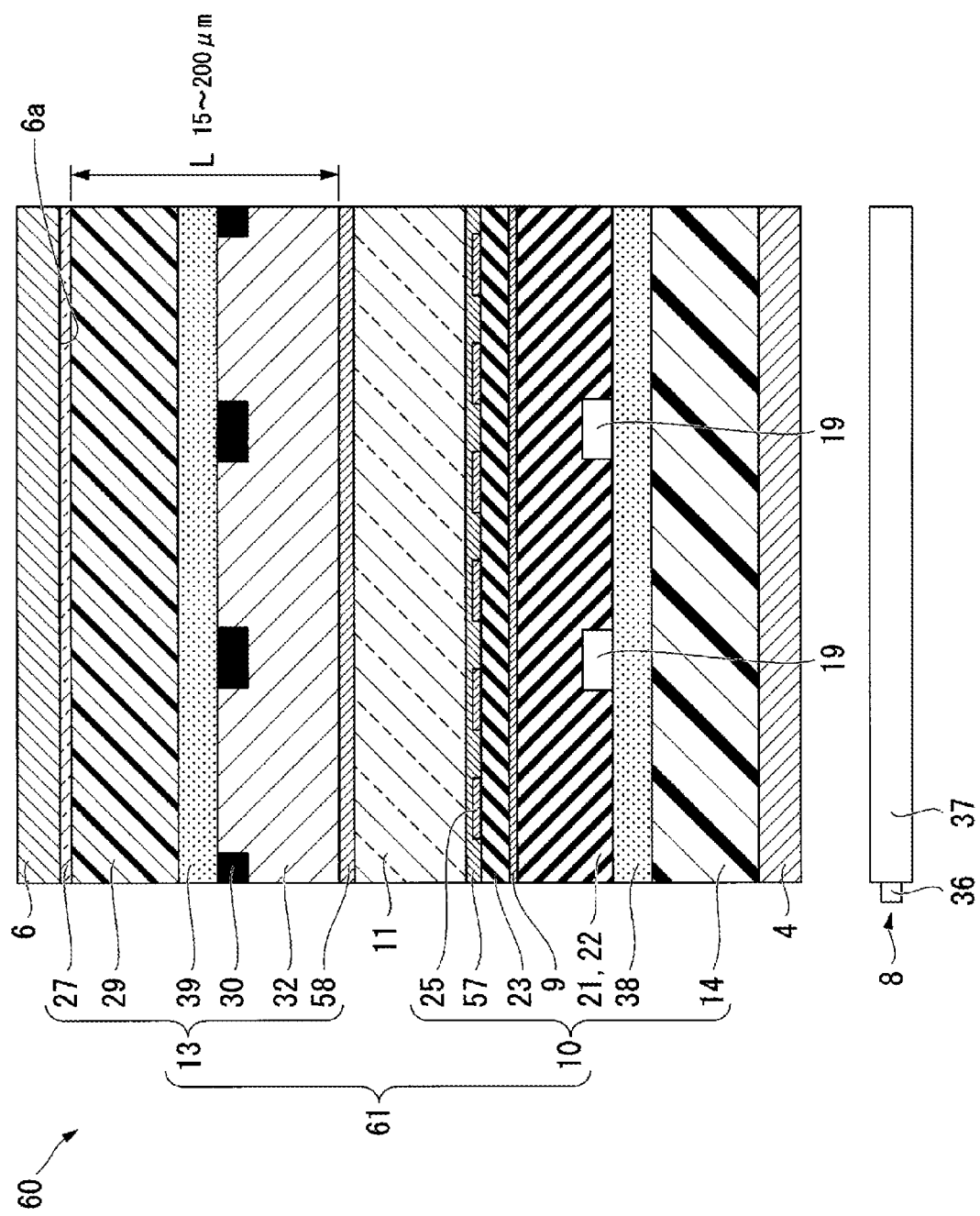
FIG. 12 is a cross-sectional view illustrating a liquid crystal configuration including no color filter.

For example, as illustrated in FIG. 12, the liquid crystal structure with no color filter may be applicable. A liquid crystal panel 60 of FIG. 12 includes a liquid crystal cell 61 including a counter substrate 13 including no color filter, the TFT substrate 10, and the liquid crystal layer 11 interposed therebetween. In this configuration, the distance L between the liquid crystal layer 11 and the transparent conductive film layer 27 is controlled to range from 15 μm to 200 μm by adjusting the thickness of the overcoat layer 32 formed, above the first substrate 29, covering the black matrix 30 that defines each of the pixels over the entire surface of the base coat 39. As long as the above-described condition is satisfied, the underlayer of the transparent conductive film layer 27 can be formed, or the distance can be adjusted by using the other component.

Also, by providing the black matrix 30 that define pixels even in the configuration with no color filter, it is possible to prevent deterioration in visibility that will occur due to reflection from a metal layer (e.g., gate wiring line, source wiring line, or the like) formed on the TFT substrate 10 side.

INDUSTRIAL APPLICABILITY

An aspect of the disclosure is applicable to a liquid crystal display device required to be capable of efficiently releasing charges accumulated in a liquid crystal panel and causes no adverse effect on display.

REFERENCE SIGNS LIST 1, 24, 33, 47, 50 Liquid crystal display device
2 Liquid crystal panel
7R Pixel
9 Common electrode
11 Liquid crystal layer
14 Second substrate
21 First interlayer insulating film (insulating film)
22 Second interlayer insulating film (insulating film)
25 Pixel electrode
27, 43, 46, 48, 51 Transparent conductive film layer
29 First substrate
30 Black matrix (color filter layer)
31 Color filter
31 Color filter (color filter layer)
34 Color filter layer
40 Etching stopper layer (insulating film)
41 Underlayer
42 Conductive film
L Distance

The invention claimed is:

1. A liquid crystal display device comprising:
a liquid crystal panel including a first substrate and a second substrate that oppose each other, and a liquid crystal layer of a horizontal alignment type provided between the first substrate and the second substrate; and
a first polarizing plate and a second polarizing plate that sandwich the liquid crystal panel, wherein
a transparent conductive film layer connected to a ground potential is on the first substrate,
a plurality of pixel electrodes are above the second substrate,
a distance between the liquid crystal layer and the transparent conductive film layer ranges from 15 μm to 200 μm,
the first substrate and the second substrate have flexibility or bendability, and
the first substrate and the second substrate each include a resin film substrate.

2. The liquid crystal display device according to claim 1, wherein a common electrode is above the second substrate substantially throughout a display region.

3. The liquid crystal display device according to claim 1, wherein a color filter layer is above the first substrate on a side closer to the liquid crystal layer.

4. The liquid crystal display device according to claim 1, wherein the first polarizing plate is provided above the first substrate on a side opposite to the liquid crystal layer, and the transparent conductive film layer is disposed between the first substrate and the first polarizing plate.

5. The liquid crystal display device according to claim 1, wherein the first polarizing plate is provided above the first substrate on a side opposite to the liquid crystal layer, and the transparent conductive film layer is provided on the first polarizing plate on a side opposite to the first substrate.

6. The liquid crystal display device according to claim 1, wherein the transparent conductive film layer is disposed between the first substrate and the color filter layer.

7. The liquid crystal display device according to claim 1, wherein the transparent conductive film layer includes a conductive film and an underlayer and is bonded to the first polarizing plate with the underlayer interposed between the transparent conductive film layer and the first polarizing plate.

8. The liquid crystal display device according to claim 1, wherein the transparent conductive film layer is a coating.

9. The liquid crystal display device according to claim 1, wherein each of the plurality of pixel electrodes has a comb shape that is open at one end of a slit.

10. The liquid crystal display device according to claim 9, wherein a width in a short-hand direction of each comb shape ranges from 1.5 μm to 3.5 μm.

11. The liquid crystal display device according to claim 9, wherein a width in the slit ranges from 2.5 μm to 4.5 μm.

* * * * *